April 13, 1937.  R. ATTI ET AL  2,076,759

AUTOMOBILE TESTING MECHANISM

Filed Jan. 25, 1934   2 Sheets-Sheet 1

INVENTORS
Raphael Atti,
Daniel J. Hayes,
BY Gustav Drews
ATTORNEY

April 13, 1937.　　　R. ATTI ET AL　　　2,076,759
AUTOMOBILE TESTING MECHANISM
Filed Jan. 25, 1934　　　2 Sheets-Sheet 2
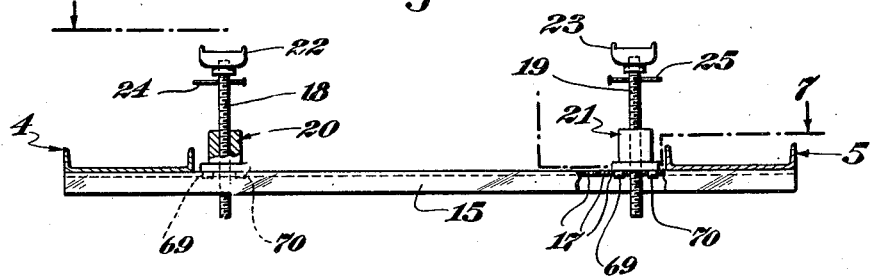
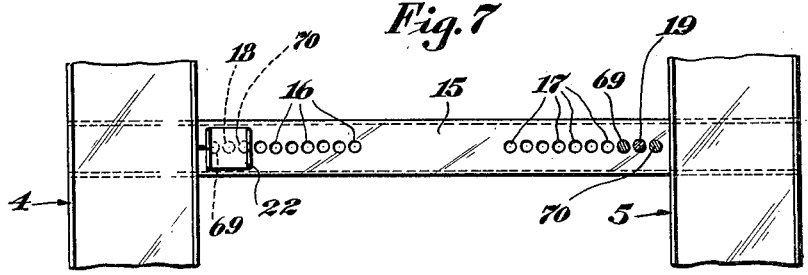
INVENTORS
Raphael Atti,
Daniel J. Hayes,
BY
ATTORNEY Patented Apr. 13, 1937

2,076,759

UNITED STATES PATENT OFFICE 2,076,759

AUTOMOBILE TESTING MECHANISM

Raphael Atti, Union City, and Daniel J. Hayes, Newark, N. J., assignors, by mesne assignments, to said Daniel J. Hayes Application January 25, 1934, Serial No. 708,212

1 Claim. (Cl. 73—51)

This invention relates to improved mechanisms for rocking the wheels of a car relative to its chassis when lubricating the same and when testing the same to detect body squeaks and the like.

Among the objects of the present invention, it is aimed to provide an improved mechanism for rocking the wheels of a car relative to its chassis embracing an eccentrically mounted support to receive the wheels of the car and means for actuating said eccentrically mounted support.

It is still another object of the present invention to provide an improved mechanism for rocking the wheels of a car or the like consisting primarily in eccentrically mounted supporting rollers to form the support of the drive wheels of the car, actuated by said wheels under the power of the car and cooperating with means for anchoring the chassis against movement relative to the driving wheels and wheel frame.

It is still another object of the present invention to provide an improved mechanism for rocking the wheels of a car or the like consisting primarily in eccentrically mounted supporting rollers for alternately raising one wheel relative to the other and forming the support for the drive wheels of the car, actuated by a separate drive mechanism when the drive wheels of the car are declutched and cooperating with means for anchoring the chassis of the car against movement relative to the wheels and associated wheel frame.

These and other features, capabilities and advantages of the invention will appear from the subjoined detail description of specific embodiments thereof illustrated in the accompanying drawings in which Figure 1 is a side elevation of a car associated with one embodiment of the present invention;

Fig. 6 is an enlarged fragmental section on the line 6—6 of Fig. 1; and

Fig. 7 is an enlarged fragmental plan on the line 7—7 of Fig. 6.

Figure 1:
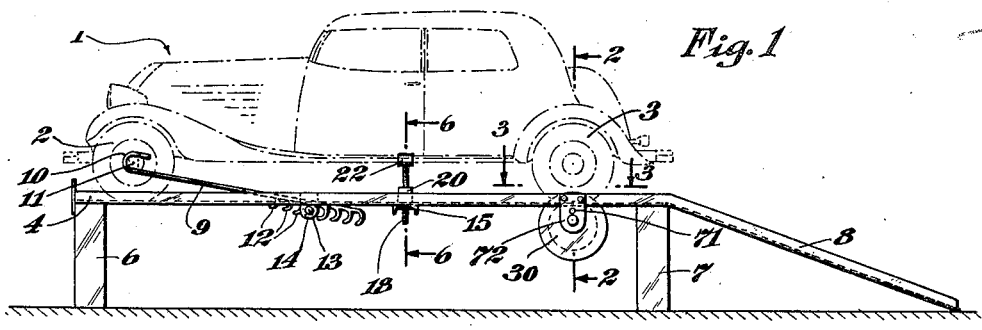

In the embodiment illustrated in Fig. 1, there is shown in dash and dot lines a car 1, with the front wheels 2 and rear wheels 3 supported on the channel bars 4 and 5 mounted on the pairs of standards 6 and 7. The channel arms 4 and 5 are preferably provided with the inclined approach extensions 8 extending from the supporting ground up to the level of the channel bars 4 and 5.

For anchoring the car 1 against forward movement, the rod 9 is provided having a loop 10 at its forward end to engage the frame cross bar 11 intermediate the front wheels 2. The lower face of the rod 9 is provided with a plurality of loops or hooks 12 to engage the cross rod 13 supported by the brackets 14 extending from the sides of the channel bars 4 and 5.

Rearwardly of the rod 13, there is provided the channel bar 15 secured to the lower faces of the channel bars 4 and 5 and extending from one to the other with the intermediate web of the channel bar 15 provided with two rows of holes 16 and 17. The holes 16 and 17 are provided to receive the rods 18 and 19 respectively. The rods 18 and 19 are preferably externally screw-threaded to cooperate with the internal threads of the bases 20 and 21 respectively.

Figure 3:
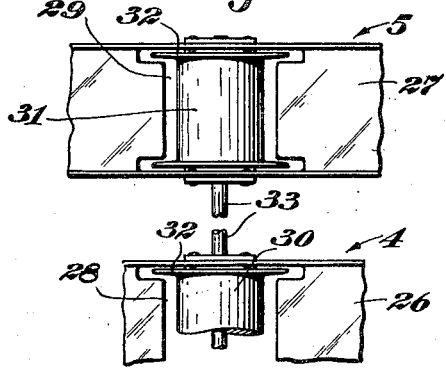
Fig. 3 is an enlarged fragmental section on the line 3—3 of Fig. 1.

At the upper ends of the rods 18 and 19, there are pivotally connected frame engaging grips 22 and 23 respectively. The rods 18 and 19 in turn are provided with the transversely extending pins 24 and 25 respectively to facilitate rotating the rods 18 and 19 according to the level to be attained for the claws 22 and 23. Rearwardly of the channel bar 15, see Fig. 3, the intermediate webs 26 and 27 of the channel bars 4 and 5 are cut away to form the openings 28 and 29 respectively conforming to the transverse section of the supporting rollers 30 and 31 respectively.

Figure 2:
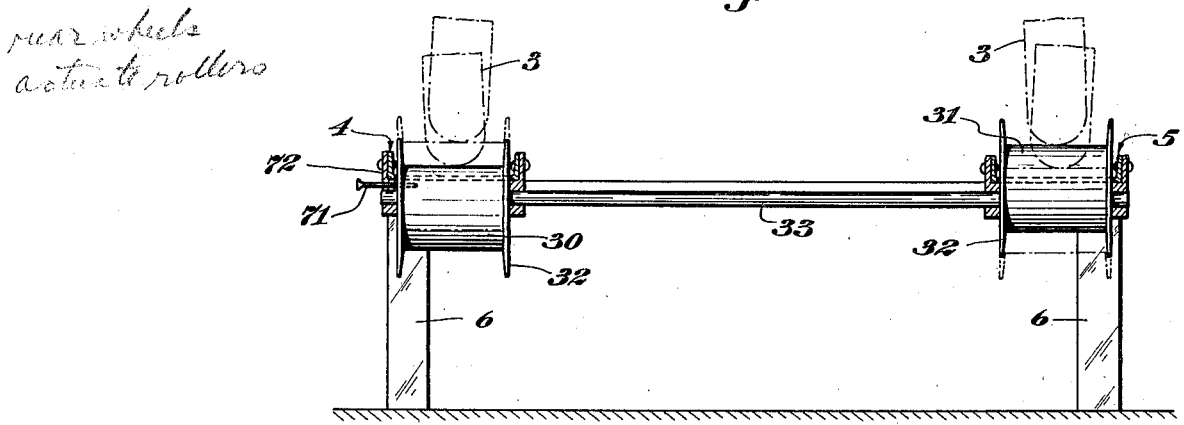
Fig. 2 is an enlarged fragmental section on the line 2—2 of Fig. 1.

The supporting rollers 30 and 31 are provided with lateral flanges 32 and the openings 28 and 29 are preferably large enough to afford ample clearance as indicated to facilitate free rotation of the rollers 30 and 31. The rollers 30 and 31 are eccentrically fixed to the shaft 33 and preferably fixed as indicated in Fig. 2, so that the lowest level of one roller will be reached at the same time that the highest level of the other roller is reached. In Fig. 2, the roller 30 in full line position is disposed at its lowest level while the supporting roller 31 in full line position is disposed at its highest level. The dash and dot line position of the roller 30 on the other hand indicates the highest level reached while the dash and dot line position of the roller 31 indicates the lowest level which it can reach.

With the embodiment illustrated in Figs. 1, 2, 3 and 4, a car 1 is preferably driven up the approach 8 under its own power onto the channel bars 4 and 5, and then the hook 10 is positioned on the cross bar 11 of the car 1 with one of its hooks 12 engaging the cross rod 13. Thereupon the rods 18 and 19 are positioned in the holes 16 and 17 which will be in alinement with the side bars of the chassis of the car 1 and thereupon the grips 22 and 23 raised by manipulation of the cross pins 24 and 25 until the grips 22 and 23 securely engage the side bars of the chassis of the car 1. Thereupon, assuming that the drive wheels 3 of the car 1 engage and rest upon the supporting rollers 30 and 31 as indicated in Fig. 1, the engine of the car 1 is started and the drive wheels connected in the usual way to be driven thereby whereupon the wheels 3 will rotate the rollers 30 and 31 to cause the wheels 3 alternately to be raised and lowered with their wheel frame while the chassis of the car remains fixed relative to the channel bars 4 and 5 by the grips 22 and 23. While the wheels 3 are so rotated, the rear springs and other associated parts may be lubricated and the lubrication freely distributed over the opposing faces as they are spread from one another. Similarly, while so rotated, an inspection for body squeaks can be undertaken.

Figure 4:
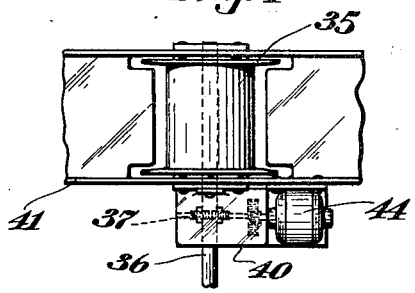
Fig. 4 is a fragmental enlarged plan of a detail of another embodiment of the present invention.
Figure 5:
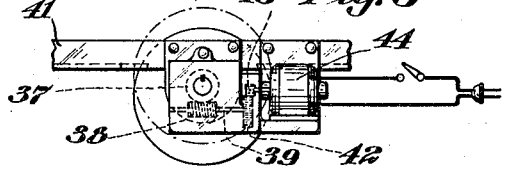
Fig. 5 is a fragmental side elevation of the structure illustrated in Fig. 4.

In the embodiment illustrated in Figs. 4 and 5 in place of the rollers 30 and 31, there are provided the rollers 35 substantially identical to the rollers 30 and 31 and fixed on the shaft 36 which has a worm wheel 37 fixed thereon in mesh with the worm 38 mounted on the shaft 39, journaled in the housing 40 and secured to the side of the channel iron 41. The shaft 39 has a gear 42 fixed thereon in mesh with the gear 43 on the shaft of the electric motor 44.

With this embodiment, the car 1 is driven onto the channel irons 41 similar to the channel irons 4 and 5 with the rear wheels 3 resting on the rollers 35. In this case, however, the engine of the car is stopped and the rear wheels declutched when the motor 44 is started and the rollers 35 thus actuated by the motor 44 instead of by the power of the car itself.

With the embodiment illustrated in Figs. 1 to 4 inclusive, see particularly Figs. 6 and 7, the bases 20 and 21 are preferably provided with two position defining pins 69 and 70 which conform to the openings 16 and 17 and seat in adjacent openings 16 or 17. The cooperation of these pins 69 and 70 with the openings 16 or 17 as indicated in Fig. 7 anchor the bases 20 and 21 against displacement especially when the rods 18 and 19 are rotated preparatory to engaging the chassis of the car or after a greasing job is completed when the claws 22 and 23 are withdrawn from engagement with the chassis of the car.

With the same embodiment, see particularly Fig. 2 in order to anchor the rollers 30 and 31 against rotation when the car is driven off the elevated support, the pin 71 is provided to extend through the opening formed in the bearing bracket 72 and an opening formed in the roller 30. It will of course be necessary to turn the roller 30 so that its opening registers with the opening in the bearing bracket 72 before the pin 71 can be inserted.

It is obvious that various changes and modifications may be made to the details of construction without departing from the general spirit of the invention as set forth in the appended claim.

We claim:

The combination with two parallel rails for supporting the wheels of a car, bearings extending down from said rails, a shaft journaled in said bearings, rollers eccentrically mounted on said shaft, a crossbar extending from one rail to the other, two arms connected to said crossbar to engage the side bars of the chassis of a car and predetermine the position of the side bars of a car relative to said rails, there being openings in said rails to permit said rollers to protrude therethrough into engagement with the rear wheels of a car so that the actuation of said rear wheels will in turn actuate said rollers to rock the wheels of the car alternately up and down relative to its chassis.

RAPHAEL ATTI.
DANIEL J. HAYES.